United States Patent [19]

Savard

[11] Patent Number: 4,634,040

[45] Date of Patent: Jan. 6, 1987

[54] PROCESS FOR WELDING PIPE ENDS AND AN INSULATING RING THEREFOR

[76] Inventor: Donald D. Savard, 15139 Ramsay Crescent, Edmonton, Alberta, Canada, T6H 5R1

[21] Appl. No.: 837,779

[22] Filed: Mar. 10, 1986

[51] Int. Cl.⁴ .............................................. B23K 9/02
[52] U.S. Cl. ..................................... 228/119; 228/59; 228/222; 285/21; 285/286
[58] Field of Search ................. 228/59, 119, 200, 222, 228/50; 285/21, 22, 286

[56] References Cited

U.S. PATENT DOCUMENTS

| | | | |
|---|---|---|---|
| 1,990,077 | 2/1935 | Kershaw | 285/21 |
| 2,173,109 | 9/1939 | Hamblin | 228/50 |
| 2,320,700 | 6/1943 | Kent | 228/50 |
| 2,409,865 | 10/1946 | Jewell | 285/22 |
| 2,893,758 | 7/1959 | Dufour | 285/286 |
| 3,736,400 | 5/1973 | Spiegel | 228/50 |
| 3,873,139 | 3/1975 | McCabe | 285/286 |

FOREIGN PATENT DOCUMENTS 50-51942 5/1975 Japan ..................................... 228/50

Primary Examiner—Nicholas P. Godici
Assistant Examiner—Christopher L. McKee
Attorney, Agent, or Firm—Ernest Peter Johnson

[57] ABSTRACT

An improvement is provided in a known process for welding liquid-filled aligned end sections of pipe. The known process involves positioning a sleeve over the junction between the pipe ends and fillet welding the two ends of the sleeve to the pipe ends. The improvement comprises providing an insulative ring within each pipe end directly beneath the line along which the sleeve's fillet weld is to be applied. The ring is composite in nature, being formed of a heat-insulating liquid-disintegratable material coated with a second material which is liquid-impermeable but slowly dissolvable in the pipe line liquid contents. The ring is operative to reduce the rate of heat transfer, from the weld area to the pipe line liquid, during welding. With a ring in place in each pipe end section, the engirdling sleeve is fillet welded to the pipe ends. Subsequently, the rings are disintegrated over time by the liquid. By slowing the rate of cooling of the weld and pipe wall in this fashion, embrittlement of the pipe wall adjacent the toe of the weld is avoided or reduced.

1 Claim, 3 Drawing Figures

PROCESS FOR WELDING PIPE ENDS AND AN INSULATING RING THEREFOR

FIELD OF THE INVENTION

The invention relates to an improvement in the process of replacing a section of a high pressure steel fluid transmission pipe line. More particularly, the invention has to do with the joining of each pipe end of the old line with an end of the newly installed replacement section. This joining procedure involves positioning a sleeve over the junction between the old pipe end and the replacement section and welding the sleeve to each of the old pipe and the new section, by means of circumferential fillet welds. The invention involves providing removable insulation internal of the pipe ends beneath the weld areas, to reduce the cooling rate of the pipe wall and thereby diminish embrittlement.

BACKGROUND OF THE INVENTION

In the high pressure fluid transmission pipe line industry, it is common practise to remove a length of the line and replace it with a segment of new pipe. This is done to remove a length of pipe having a defect in its wall or to install new valve equipment and the like. The procedure used involves the utilization of sleeves, identified in the trade by the trade mark 'Weld Plus Ends'. Such sleeves are slidably mounted over the junctions of the two sets of aligned adjacent pipe ends. Each encircling sleeve is circumferentially welded at each of its ends to the underlying pipe ends, by means of fillet welds.

Prior to the welding operation, it is necessary to flood that portion of the line under repair with a liquid, to empty it of gases, with the aim of eliminating the risk of explosion attendant therewith. The presence of loading liquid in the pipe line is maintained during the repair operation.

To satisfactorily execute the circumferential fillet welds, it is necessary to heat the pipe wall to the proper welding temperature along the area to be welded. The presence of the loading liquid significantly accelerates the cooling rate of the fillet weld and the adjacent pipe wall. When the cooling rate is too rapid, the pipe steel will form brittle martensitic microstructures along the toe of the circumferential fillet weld. This is undesirable, as the pipe often fails at this point when the line is subjected to stress, for example when there is shifting during freeze/thaw cycles of the soil or when there is external loading applied.

There exists, therefore, a need to address the problem of the deleterious cooling effect of the liquid upon the fillet welding process and to attempt a solution which avoids the disadvantages inherent in the prior art techniques.

SUMMARY OF THE INVENTION

In accordance with the present invention there is provided an improvement functional to diminish the rate of heat transfer from the heat-affected area of the pipe to the liquid therein.

More particularly, there is provided an improvement in the known process for joining together a pair of aligned end sections of steel pipe, internally filled with liquid, utilizing a cylindrical steel sleeve positioned over the junction between adjacent pipe ends and welded thereto by mean of circumferential fillet welds. The improvement comprises:

positioning an insulative composite ring, formed of a body of heat-insulating liquid-disintegratable material coated with a second material which is liquid-impermeable but slowly dissolvable in the pipe liquid, within each pipe end and contiguous thereto, beneath the anticipated area of the weld, whereby the rate of heat transfer from the weld and pipe end wall to the liquid will be reduced during the welding process; and fillet welding the sleeve ends to the pipe end sections with the insulating rings positioned therein; and subsequently disintegrating the rings with the liquid.

In a product aspect, an insulative composite ring is provided. The ring comprises a body of heat-insulating liquid-disintegratable material, coated with a second material which is liquid-impermeable but slowly dissolvable in the liquid in the line. The second material dissolves with time to leave the insulative body exposed to the moving liquid, which gradually removes the ring.

DESCRIPTION OF THE PREFERRED EMBODIMENT

The invention involves a composite insulating ring 1 whose character is influenced by the following points:

(1) It is annular, providing a central opening so that liquid can pass through it with the ring in place in the pipe section being welded;

(2) It has a close friction fit with the inside surface of the pipe section, so that it will remain fixed as liquid moves through it;

(3) It is primarily formed of high temperature insulating material which, when exposed to moving liquid, will disintegrate into a soft pulp that will not damage or jam downstream valves or pumps; and (4) It comprises a second material which is liquid-impermeable but slowly soluble in the liquid filling the pipe section being repaired. The second material is functional to temporarily isolate or protect the insulating material from the disintegrating action of the pipe line liquid.

Figure 1:
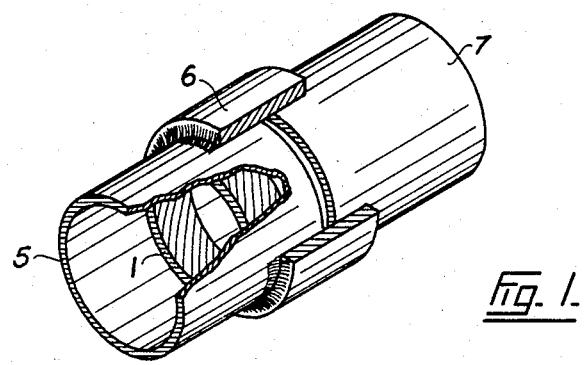
FIG. 1 is a perspective view of a preferred form of a disintegratable insulation ring in place in a repaired line.

The ring 1 shown in FIG. 1 comprises a body 2 of heat-insulating liquid-disintegratable material coated with liquid-impermeable but slowly liquid-dissolvable material. Typically the coating material can be paraffin wax, which is soluble in oil, which is the usual liquid in the line.

Figure 2:
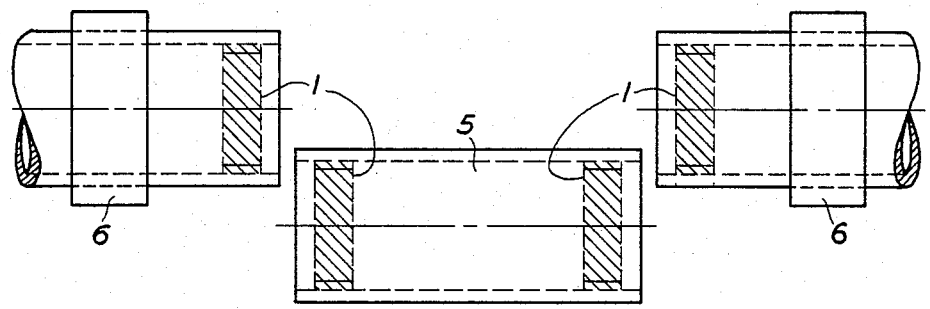
FIG. 2 is a side view showing a replacement section of pipe about to be inserted between the end sections of the pipe line, with the sleeves in place on the end sections and the rings in place in the end sections.
Figure 3:
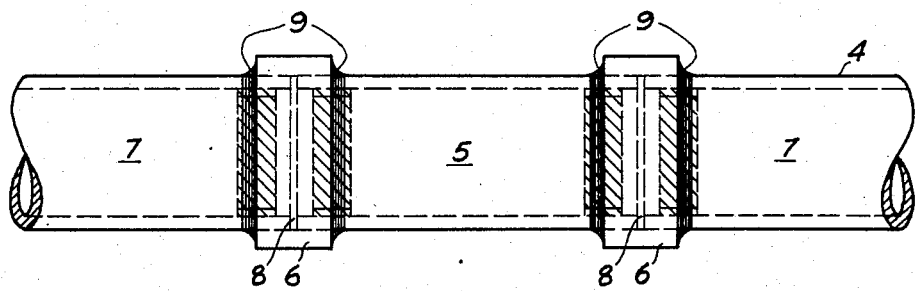
FIG. 3 is a side view of a completed pipe repair assembly.

Having reference now to FIG. 2, there is shown a steel pipe line 4 from which a defect-containing section has been cut out. A new section 5 of pipe is to be inserted.

Conventional repair sleeves 6, having internal gaskets (not shown), are slipped onto the end sections 7 of the pipe line.

The rings 1 are inserted in the pipe line end sections 7 and the ends of the new pipe section 5, to underlie the areas where the fillet welds are to be applied.

The new pipe section 5 is then aligned with the pipe line end sections 7 and each sleeve 6 is moved to bridge the adjacent junction 8 between the pipe sections.

The sleeve gaskets are then tightened around the pipe sections to seal the junctions 8. Load liquid is pumped into the pipe line to displace gas from the repair area.

Circumferential fillet welds 9 are then applied between the sleeve ends and the pipe sections, to join section 5 into a solid unit with the pipe line end sections 7.

The utility of the invention is demonstrated by the following example, which is based on a test conducted to show the performance of the rings in reducing the hardness developed in the pipe wall following welding.

EXAMPLE

An insulating ring was constructed as follows: A ring of insulating material was formed having dimensions of 16.538" I.D. and 19.538" O.D. The material used was a high temperature insulator sold by Johns Manville Corporation under the trade mark Fibrotex. The insulation ring was dipped in liquid paraffin wax to completely coat it. The wax layer was intended to keep the insulation material temporarily isolated from the pipe line liquid, for a period of time in the order of 24 hours.

A 5' length of 0.281" thick steel pipe having a 19.538" I.D. had the rings emplaced therein. The ends of the pipe were then closed with bolted caps. Two sleeves were positioned on the pipe so that one sleeve had the insulating ring positioned beneath its anticipated weld line and the other did not.

Water was circulated through the pipe.

With the pipe filled with water, a fillet weld was applied to the sleeve and the pipe directly over the insulator ring. A second weld was applied to the second sleeve without an internal insulative ring.

Four coupons were then cut longitudinally of the weld area at each of the welds. A hardness survey was conducted on each of the coupons The results were averaged to give the followin results:

|  | Vickers Hardness |
| --- | --- |
| Sleeve No. 1 | |
| at weld over the ring: | 233 |
| Sleeve No. 2 | |
| at weld without the ring: | 363 |

A Vickers Hardness value of about 400 in the pipe wall adjacent a weld is commonly considered undesirable in industry practice. A value under 350 is commonly considered well acceptable.

The embodiments of the invention in which an exclusive property or privilege is claimed are defined as follows:

1. In a process for joining together a pair of aligned end sections of steel pipe, internally filled with liquid, utilizing a cylindrical steel sleeve positioned over the junction between adjacent pipe ends and welded thereto by means of circumferential fillet welds, the improvement comprising:

positioning a composite ring, comprising a body of heat-insulating, liquid-disintegratable material coated with a liquid-impermeable material which dissolves slowly in the pipe liquid, within each pipe end section and contiguous thereto, beneath the anticipated area of the circumferential fillet weld, whereby the rate of heat transfer from the weld and pipe end to the liquid in the pipe will be reduced during the welding process;

fillet welding the sleeve ends to the pipe end sections with the insulating rings positioned therein; and subsequently disintegrating the rings in the liquid.

* * * * *